United States Patent

Semon

[15] 3,643,683
[45] Feb. 22, 1972

[54] DOUBLE VENTURI PRESSURE REGULATOR

[72] Inventor: Albert L. Semon, 11 Eliot Pl., Short Hills, N.J. 07078

[22] Filed: Sept. 23, 1970

[21] Appl. No.: 74,746

[52] U.S. Cl. ........................... 137/484.8, 137/505.18
[51] Int. Cl. ........................................... F16k 17/34
[58] Field of Search ............ 137/116.3, 116.5, 484.2, 484.6, 137/484.8, 505.18, 505.26, 505.36, 505.37

[56] References Cited

UNITED STATES PATENTS

| | | | |
|---|---|---|---|
| 2,720,892 | 10/1955 | Mitchell | 137/505.37 X |
| 2,890,713 | 6/1959 | Semon | 137/484.8 |
| 3,189,043 | 6/1965 | Stadler | 137/484.8 X |
| 3,392,749 | 7/1968 | Gneiding et al. | 137/505.26 X |

*Primary Examiner*—Henry T. Klinksiek
*Attorney*—Harry B. Rook

[57] ABSTRACT

A fluid pressure regulator casing has a piston valve in a cylinder coactive with an adjustable spring-pressed diaphragm to control flow of fluid from an inlet passage through an outlet duct across which extends a venturi tube for subjecting both said diaphragm and said piston valve to the pressure produced by fluid flow through said outlet duct past the venturi tube, so that the regulator may be small and may have greater capacity or outlet flow and less pressure drop in relation to prior regulators. A locking ring coaxially rotatable on a resilient flange on the casing coacts with said flange to lock and release an adjusting knob for the regulation of the spring pressure on the diaphragm with a minimum of possibility of unintentional rotation of the knob from its adjusted position.

5 Claims, 4 Drawing Figures

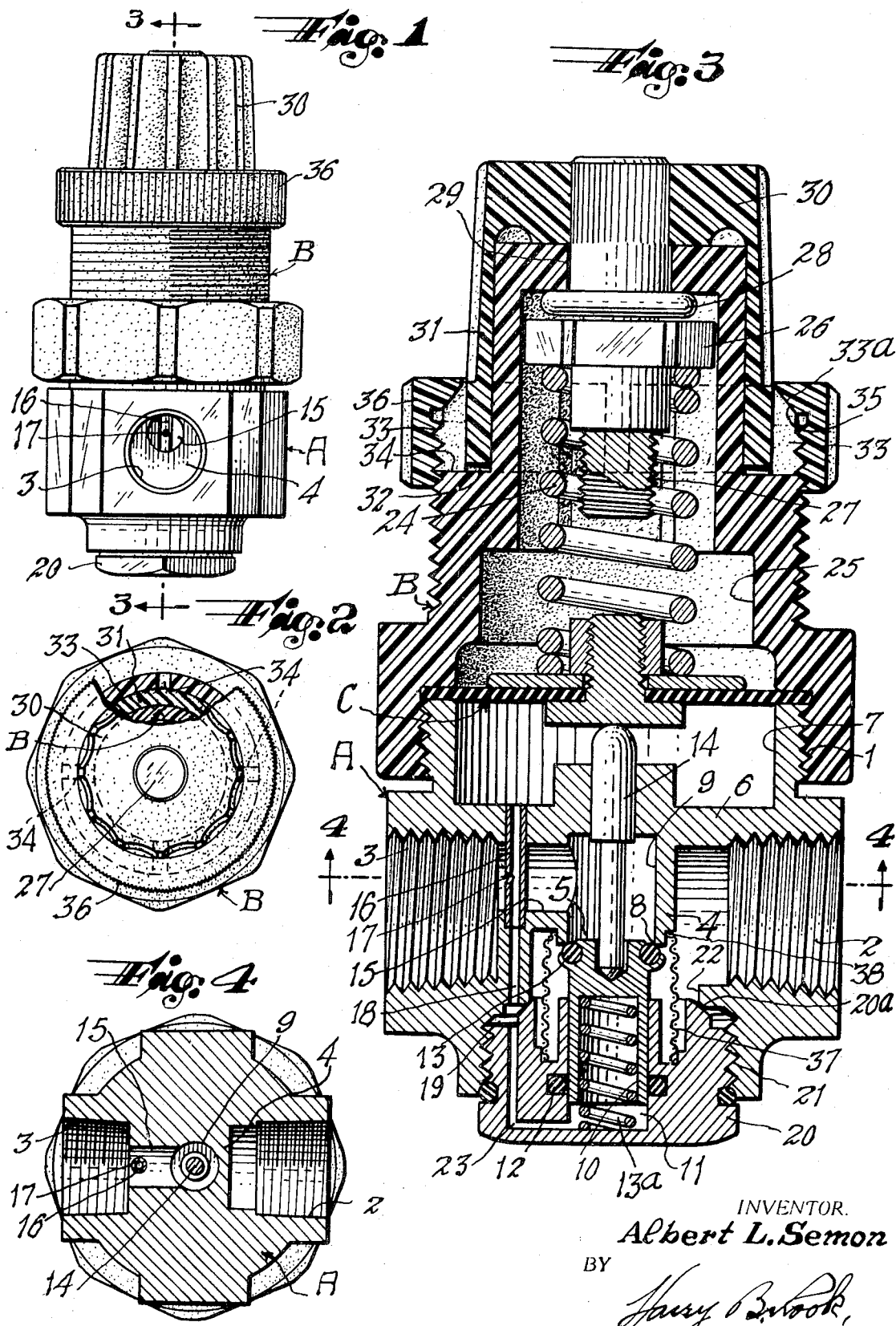

DOUBLE VENTURI PRESSURE REGULATOR

BACKGROUND OF THE INVENTION

1. Field of the Invention

This invention relates to fluid pressure regulators of the type including a valve casing that has an inlet and an outlet between which is a valveport and a valve seat with which cooperates a piston valve head whose stem or spindle abuts a resilient diaphragm clamped at its edge in the casing and having its opposite sides responsive respectively to the downstream or outlet pressure of a fluid such as steam, and to regulating pressure such as a spring or air.

2. Description of the Prior Art

Prior art regulators having large capacity or flow volume are large, cumbersome and costly. Also such valves operate with a large pressure drop between the outlet or downstream pressure and the inlet or upstream pressure.

SUMMARY

A primary object of the present invention is to provide a regulator which is small and has greater capacity or flow and less pressure drop in relation to its size than prior regulators.

The invention especially contemplates in a regulator of the general type described with a piston valve, the provision of a double venturi tube extending across the outlet port of the regulator and having its ends communicating, respectively, with a chamber beneath the diaphragm and a chamber beneath the piston valve, and also having an orifice in its wall facing in the direction of the fluid flow through the outlet whereby during operation of the regulator the pressure is lowered under the diaphragm and under the piston valve and the pressure is increased at the valve. The greater the differential between these pressures may be, the greater will be the opening of the valve so that the volume of outlet flow will be increased and the pressure drop will be decreased.

Another object of the invention is to provide novel and improved means for releasably locking or clamping the adjusting knob for the diaphragm spring with a minimum of possibility of unintentionally altering the position of the knob after the desired adjustment has been made.

The invention also contemplates a novel and improved piston valve of the same diameter as the valve seat to provide space in the casing for a strainer to filter the fluid before it reaches the valve.

BRIEF DESCRIPTIONS OF THE DRAWING

For a more complete understanding of the invention, reference should be made to the following description in conjunction with the accompanying drawings in which FIG. 1 is a side elevation of a fluid pressure regulator embodying the invention.

FIG. 2 is a top plan view thereof with portions broken away and shown in section.

FIG. 3 is a greatly enlarged fragmentary vertical sectional view on the plane of the line 3—3 of FIG. 1.

FIG. 4 is a horizontal sectional view, on a reduced scale, on the plane of line 4—4 of the FIG. 3.

DESCRIPTION OF THE PREFERRED EMBODIMENTS

Specifically describing the invention, the valve casing is shown as comprising a body A and a cover B secured on the body by screw threads 1 and having clamped between them a diaphragm C. The valve body has an inlet passage 2 and an outlet passage 3 separated by a partition 4 in which is a valve outlet port 5. Between the diaphragm C and the top wall or partition 6 of the body is a closed space or chamber 7.

The valve port has a seat 8 disposed at one end of an outlet chamber 9 which is coaxial with the diaphragm C, and cooperative with the valve seat is a piston valve 10, slidably mounted in a valve cylinder 11 in the wall of which a packing ring 12 to prevent leakage between the valve and the cylinder wall. The valve is of smaller diameter than the outlet chamber 9 and has an O-ring 13 secured exteriorly thereon at one end to engage the valve seat 8 for closing the valve port. A spring 13a normally biases the valve into closed position, and a thrust pin 14 is abuttingly interposed between the valve and the diaphragm.

An outlet duct 15 extends from the outlet chamber to the outlet passage 3 with its axis approximately parallel to the axis of the passage; and preferably the diameter of the outlet duct is less than that of the outlet chamber, so that the velocity of flow of the fluid from the outlet chamber is increased. Extending across the outlet duct with its axis perpendicular to the axis of the duct and approximately in a diametral plane of the duct, is a venturi tube 16 whose ends communicate with the closed space 7 beneath the diaphragm and with the valve cylinder 11 beneath the valve, respectively. The tube has an orifice 17 in its side wall facing in the direction of the flow of the fluid through the outlet duct. To establish communication between the tube and the valve cylinder, the valve body has a passage 18 extending from one end of the tube to an annular space 19 which is formed at the inner end of a screw plug 20 screwed into an opening 21 in the valve body coaxially with the valve port and having a frustoconical surface 20a at its inner end to engage the edge of an opening 22 in the valve body to prevent communication of the inlet passage 2 with the valve cylinder. The space 19 is formed between the inner end of plug 20 and the wall of the opening 21, and a passage 23 is formed in the plug to establish communication between the space 19 and the end of the valve cylinder 11.

During the operation of the regulator the diaphragm is subject to a regulating pressure by a compression spring 24 and when the piston valve 10 is open, the fluid in the inlet passage tube will flow past the end of the valve into the outlet chamber and through the outlet duct around the venturi tube into the outlet passage; and, therefore, the diaphragm C and the valve 10 will be subject to the fluid pressure produced by the fluid flow through the outlet duct past the venturi tube to the outlet passage. This pressure is lowered under the diaphragm and under the piston valve, and the pressure is increased in the outlet chamber. The greater the differential between these pressures may be, the greater will be the opening of the valve so that the volume of outlet flow will be increased and the pressure drop will be decreased. It will be understood by those skilled that by varying the pressure of spring 24 on the diaphragm the outlet pressure and pressure differential may be varied as desired.

The spring 24 is shown as mounted in a chamber 25 in the cover B, with one end abutting the diaphragm and the other end abutting a nut 26 which has a screw threaded connection with a regulator screw 27 but is nonrotatable in the cover so that by the rotation of the screw the nut will move longitudinally of the screw. The screw has a flange 28 abutting the end of the casing wall and the screw projects outwardly through an opening 29 in the end wall of the casing. Connected to the projecting end of the screw is an inverted cup-shaped knob 30 fitted over the end of the casing cover B with its side wall 31 extending into an annular recess 32 formed between the wall of the casing and a coaxial exterior flange 33 on the casing. The flange 33 is longitudinally slotted at 34 so that the portions between the slots are resilient, and the edge of the flange has a frustoconical surface 33a which coacts with a frustoconical surface 35 on the inner side of a clamping or locking ring 36 which is screwed on the exterior of the flange so that when the ring is rotated in one direction the casing flange is compressed to grip or clamp the sidewall of the knob between the casing flange and the casing wall, thereby to hold the knob in its adjusted position.

It is desirable in such regulators to provide a screen to filter solid particles from the inflowing fluid before they reach the valve wall, and as indicated herein before, the piston valve 11 is smaller in diameter than the valve seat 8 and provides adequate space in the body A for a cylindrical screen 37 which has one end abutting the plug 20 and its other end abutting a shoulder 38 on the partition 4.

It will thus be seen that the invention provides a small regulator that has a greater capacity or volume of outflow and a smaller pressure drop in relation to its size than prior regulators.

I claim:

1. A fluid pressure regulator comprising a casing having inlet and outlet passages and a partition between said passages provided with a valve port to afford communication between said inlet passage and an outlet chamber which has an outlet duct which leads to said outlet passage and is smaller in cross section than said outlet chamber, said casing having a valve cylinder in which is a piston valve for controlling flow of fluid through said valve port and normally spring biased to cause one end thereof to close said port, a diaphragm secured in said casing and forming a closed space between itself and the side of the partition opposite said valve, a thrust pin slidably mounted in said partition and abuttingly interposed between said piston valve and said diaphragm, a venturi tube extending across said outlet duct and having an orifice in its wall facing in the direction of fluid flow through said outlet duct, the ends of said tube communicating with said closed space and with said valve cylinder beneath the other end of said piston valve, respectively, whereby said piston valve and the side of said diaphragm in said closed space are subject to fluid pressure produced by the fluid flow through said outlet duct past said venturi tube to said outlet passage, and means for applying regulating pressure to the opposite side of said diaphragm.

2. A fluid pressure regulator as defined in claim 1 wherein said valve port is at one end of said outlet chamber and has a valve seat for said end of said valve, said casing has an opening coaxial with said valve seat, there is a screw plug separably fitted in said opening and having therein said valve cylinder in which said valve is mounted, and said screw plug has a passage communicating at one end with said venturi tube and at its other end with said valve cylinder.

3. A fluid pressure regulator as defined in claim 1 wherein said casing has a chamber at the second-mentioned side of said diaphragm, the last-named means comprises an adjusting screw rotatably mounted in said casing and having a nut mounted relatively nonrotatably thereon and movable longitudinally thereof, a compression spring interposed between said nut and said diaphragm, and an inverted cup-shaped knob fixed on said screw and having a coaxial side wall fitted over said casing which has a coaxial exterior flange providing between itself and the wall of the casing an annular recess into which extends the side wall of said knob, said flange on the casing being slotted and resilient and having a frustoconical surface at its edge, and a clamping ring screw threaded on said casing flange and having a frustoconical surface to coact with said frustoconical surface on said casing flange for compressing said flange to clamp said side wall of the knob between said casing flange and the casing wall and thereby hold the knob in adjusted position.

4. A fluid pressure regulator as defined in claim 1 wherein said valve port is at one end of said outlet chamber and has a valve seat for said end of the valve, said outlet duct has its axis perpendicular to the axis of said outlet chamber and parallel to the axis of said outlet passage, and said venturi tube has its axis perpendicular to the axis of said outlet duct and lying in a diametral plane of said duct.

5. A fluid pressure regulator as defined in claim 4 wherein said piston valve is smaller in diameter than said valve seat and has an O-ring packing secured exteriorly thereto to engage said valve seat for closing said port.

* * * * *